(12) United States Patent
Gardner et al.

(10) Patent No.: US 9,978,533 B2
(45) Date of Patent: May 22, 2018

(54) ENERGY STORAGE DEVICE, METHOD OF MANUFACTURING SAME, AND MOBILE ELECTRONIC DEVICE CONTAINING SAME

(75) Inventors: Donald S. Gardner, Los Altos, CA (US); Tomm V. Aldridge, Olympia, WA (US); Charles W. Holzwarth, San Jose, CA (US); Cary L. Pint, Hayward, CA (US); Zhaohui Chen, San Jose, CA (US); Wei C. Jin, Sunnyvale, CA (US); Yang Liu, State College, PA (US); John L. Gustafson, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 513 days.

(21) Appl. No.: 13/977,493

(22) PCT Filed: Feb. 21, 2012

(86) PCT No.: PCT/US2012/025973
§ 371 (c)(1),
(2), (4) Date: Sep. 23, 2014

(87) PCT Pub. No.: WO2013/126050
PCT Pub. Date: Aug. 29, 2013

(65) Prior Publication Data
US 2015/0049414 A1  Feb. 19, 2015

(51) Int. Cl.
*H01G 11/30* (2013.01)
*H01G 11/00* (2013.01)
(Continued)

(52) U.S. Cl.
CPC ............. *H01G 11/00* (2013.01); *H01G 11/26* (2013.01); *H01G 11/30* (2013.01); *H01G 11/52* (2013.01); *H01G 11/84* (2013.01); *Y02E 60/13* (2013.01)

(58) Field of Classification Search
CPC .......... H01G 9/00; H01G 11/04; H01G 11/28; H01G 11/42; H01G 11/30; H01G 11/26
See application file for complete search history.

(56) References Cited

U.S. PATENT DOCUMENTS

| 5,748,438 A | 5/1998 | Davis et al. |
| 7,835,136 B2 | 11/2010 | Feaver et al. |

(Continued)

FOREIGN PATENT DOCUMENTS

| CN | 1860567 A | 11/2006 |
| JP | 10-321481 A | 12/1998 |

(Continued)

OTHER PUBLICATIONS

Office Action received for Chinese Patent Application No. 201280070312.9 dated Apr. 29, 2016, 13 pages of Office Action including 8 pages of English translation.

(Continued)

*Primary Examiner* — Nguyen Ha
(74) *Attorney, Agent, or Firm* — Thorpe North and Western, LLP; David W. Osborne (57) ABSTRACT

An energy storage device includes a middle section (610) including a plurality of double-sided porous structures (500), each of which contain multiple channels (511) in two opposing surfaces (515, 525) thereof, an upper section (620) comprising a single-sided porous structure (621) containing multiple channels (622) in a surface (625) thereof, and a lower section (630) including a single-sided porous structure (631) containing multiple channels (632) in a surface (635) thereof.

13 Claims, 6 Drawing Sheets

(51) Int. Cl.
*H01G 11/26* (2013.01)
*H01G 11/52* (2013.01)
*H01G 11/84* (2013.01)

(56) References Cited

U.S. PATENT DOCUMENTS

| | | | |
|---|---|---|---|
| 2003/0086238 A1* | 5/2003 | Bendale | H01G 9/155 361/502 |
| 2006/0130300 A1 | 6/2006 | Kobayashi et al. | |
| 2007/0177332 A1 | 8/2007 | Kobayashi et al. | |
| 2010/0053844 A1* | 3/2010 | Eilertsen | H01G 11/86 361/502 |
| 2013/0095392 A1* | 4/2013 | Shin | H01G 9/2013 429/338 |
| 2013/0208404 A1* | 8/2013 | Yasuda | H01G 11/06 361/516 |

FOREIGN PATENT DOCUMENTS

| | | | |
|---|---|---|---|
| WO | 2011123135 A1 | | 10/2011 |
| WO | WO2013/066337 | * | 5/2013 |
| WO | 2013/126050 A1 | | 8/2013 |

OTHER PUBLICATIONS

International Search Report and Written Opinion received for PCT Patent Application No. PCT/US2012/025973, dated Jan. 31, 2013, 9 pages.

IInternational Preliminary Report on Patentability received for PCT Patent Application No. PCT/US2012/025973, dated Sep. 4, 2014, 6 pages.

\* cited by examiner

ENERGY STORAGE DEVICE, METHOD OF MANUFACTURING SAME, AND MOBILE ELECTRONIC DEVICE CONTAINING SAME

FIELD OF THE INVENTION

The disclosed embodiments of the invention relate generally to energy storage devices, and relate more particularly to performance enhancement and manufacturing techniques for energy storage devices.

BACKGROUND OF THE INVENTION

Modern societies depend on the ready availability of energy. As the demand for energy increases, devices capable of efficiently storing energy become increasingly important. As a result, energy storage devices, including batteries, capacitors, electrochemical capacitors (ECs), (including pseudocapacitors and electric double-layer capacitors (EDLCs)—also known as ultracapacitors, among other names), hybrid ECs, and the like are being extensively used in the electronics realm and beyond. In particular, capacitors are widely used for applications ranging from electrical circuitry and power delivery to voltage regulation and battery replacement. Electrochemical capacitors are characterized by high energy storage capacity as well as other desirable characteristics including high power density, small size, and low weight, and have thus become promising candidates for use in several energy storage applications.

The related case mentioned above (International Application No. PCT/US2010/029821) discloses three-dimensional structures for forming high energy density electrochemical capacitors using, for example, porous silicon. In some of the disclosed embodiments, an electrochemical process was used to etch pores deep into a silicon structure and the pores were filled with an electrolyte or with a high-k dielectric material and/or a thin conductive film in combination with an electrolyte.

BRIEF DESCRIPTION OF THE DRAWINGS

The disclosed embodiments will be better understood from a reading of the following detailed description, taken in conjunction with the accompanying figures in the drawings in which.

For simplicity and clarity of illustration, the drawing figures illustrate the general manner of construction, and descriptions and details of well-known features and techniques may be omitted to avoid unnecessarily obscuring the discussion of the described embodiments of the invention. Additionally, elements in the drawing figures are not necessarily drawn to scale. For example, the dimensions of some of the elements in the figures may be exaggerated relative to other elements to help improve understanding of embodiments of the present invention. Certain figures may be shown in an idealized fashion in order to aid understanding, such as when structures are shown having straight lines, sharp angles, and/or parallel planes or the like that under real-world conditions would likely be significantly less symmetric and orderly. The same reference numerals in different figures denote the same elements, while similar reference numerals may, but do not necessarily, denote similar elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Similarly, if a method is described herein as comprising a series of steps or operations, the order of such steps or operations as presented herein is not necessarily the only order in which such steps or operations may be performed, and certain of the stated steps or operations may possibly be omitted and/or certain other steps or operations not described herein may possibly be added to the method. Furthermore, the terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," and the like in the description and in the claims, if any, are used for descriptive purposes and not necessarily for describing permanent relative positions unless otherwise indicated either specifically or by context. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical or non-electrical manner. Objects described herein as being "adjacent to" each other may be in physical contact with each other, in close proximity to each other, or in the same general region or area as each other, as appropriate for the context in which the phrase is used. Occurrences of the phrase "in one embodiment" herein do not necessarily all refer to the same embodiment.

DETAILED DESCRIPTION OF THE DRAWINGS

Electrochemical capacitors made using porous conducting or semiconducting substrates, such as those disclosed in the related case mentioned above, offer significant benefits in terms of energy storage. Assembling porous conducting or semiconducting substrates to form a large EC is challenging, however, because the porous substrates are typically flat and relatively thin and fragile. The substrates can be made thicker in order to compensate, but the resulting deeper pores will become more challenging to fill with electrolytes and with films deposited using atomic layer deposition (ALD) and the like. Also, thicker porous structures can be increasingly sensitive to stress and cracking during processing. As will be discussed in detail below, embodiments of the invention provide mechanical strength and support for an EC or other energy storage device while simultaneously simplifying its assembly.

In one embodiment of the invention, an energy storage device comprises a middle section comprising a plurality of double-sided porous structures, each of which contain multiple channels in two opposing surfaces thereof, an upper section comprising a single-sided porous structure containing multiple channels in a surface thereof, and a lower section comprising a single-sided porous structure containing multiple channels in a surface thereof.

Although much of the discussion herein will focus on electrochemical capacitors, the "energy storage device" designation explicitly includes—in addition to ECs—hybrid electrochemical capacitors (which, like electrochemical capacitors, are discussed in more detail below) as well as batteries, fuel cells, and similar devices that store energy. Energy storage devices according to embodiments of the invention can be used for a wide variety of applications, including in personal computers (PCs), including desktop and laptop (notebook) computers, tablet computers, cell phones, smart phones, music players, servers, other electronic devices, automobiles, buses, trains, airplanes, other transportation vehicles, home energy storage, storage for energy generated by solar or wind energy generators, especially energy harvesting devices, and many others.

Electrochemical capacitors operate according to principles similar to those that govern conventional parallel plate capacitors, but certain important differences do apply. One significant difference concerns the charge separation mechanism. For one important class of ECs this typically takes the form of a so-called electric double layer, or EDL, rather than of the dielectric of a conventional capacitor. The EDL is created at an interface between an electrolyte and a high-surface area electrode by the electrochemical behavior of electrons (or holes) on one side of the interface and ionic charge carriers on the other side, and results in an effective separation of charge in spite of the fact that the two layers within the double layer are so close together. (Physical separation distances are on the order of a single nanometer.) Thus, a typical EDL capacitor may be thought of as storing charge in its EDL. Each layer of the EDL is electrically conductive but the properties of the double layer prevent current from flowing across the boundary between them. (The EDL is further discussed below in connection with FIG. 3.)

As is true in conventional capacitors, capacitance in an EDL capacitor is proportional to the surface area of the electrodes and inversely proportional to the charge separation distance. The very high capacitances achievable in an EDL capacitor are due in part to the very high surface area attributable to the multi-channel porous structure and to the nanometer-scale charge separation distance attributable to the EDL, which arises due to the presence of an electrolyte, as explained above. One type of electrolyte that may be used in accordance with embodiments of the invention is an ionic liquid. Another is an electrolyte (e.g., $Li_2SO_4$, $LiPF_6$) comprising an ion-containing solvent. Organic electrolytes, aqueous electrolytes, and solid-state electrolytes are also possible.

Another class of electrochemical capacitor is the pseudocapacitor, where, in addition to EDL capacitance a different storage mechanism—one that is Faradaic and not electrostatic in origin—can arise at the surface of certain types of electrodes. This is typically referred to as "pseudocapacitance," and is characterized by a charge storage process that is similar to the operation of many solid-electrode batteries.

Typically, one of the electrodes of a pseudocapacitor is coated with a transition metal oxide such as $MnO_2$, $RuO_2$, $NiO_x$, $Nb_2O_5$, $V_2O_5$, etc., or with other materials including $Mo_2N$, VN, $W_2N$, $W_2C$ (tungsten carbide). $Mo_2C$, VC, a suitable conducting polymer, or a similar material that makes up the active material where charge is stored. These materials can be used with an electrolyte such as a potassium hydroxide (KOH) solution; when the device is charged, the electrolyte will react with the material and drive a charge transfer reaction where energy is stored. More specifically, these materials store most of their energy through highly-reversible surface and near-surface redox (Faradaic) reactions, which enable higher power than bulk storage in conventional batteries due to the fast charge and discharge kinetics.

Hybrid electrochemical capacitors are energy storage devices that combine the attributes of ECs and batteries. In one example, an electrode coated with a lithium ion material is combined with an electrochemical capacitor in order to create a device that has an EC's rapid charge and discharge characteristics and a battery's high energy density. On the other hand, hybrid ECs, like batteries, have shorter expected lifespans than do electrochemical capacitors.

Figure 1:
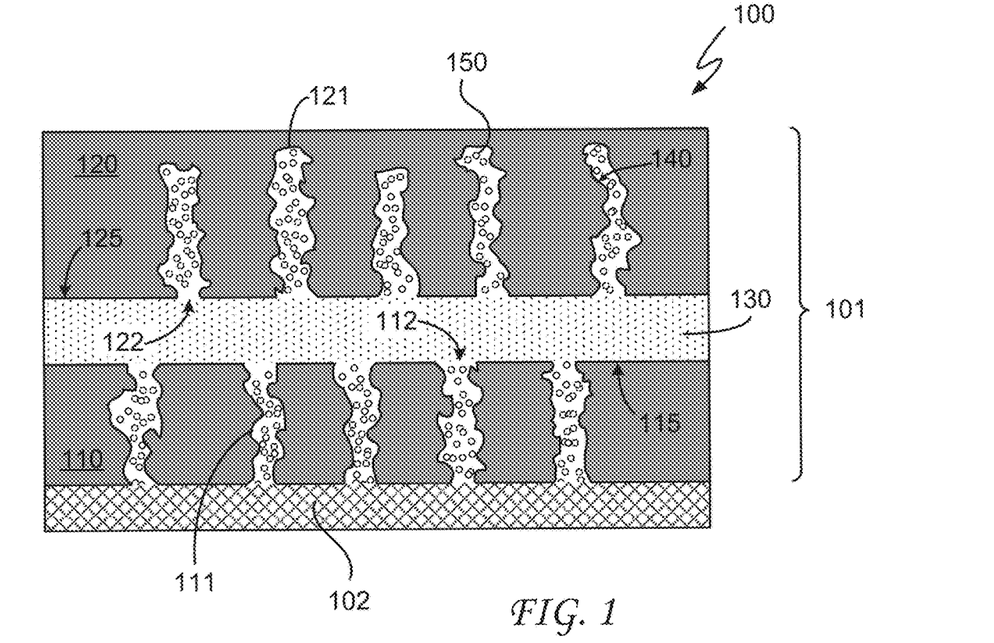
FIGS. 1 and 2 are cross-sectional views of an energy storage device according to embodiments of the invention.
Figure 2:
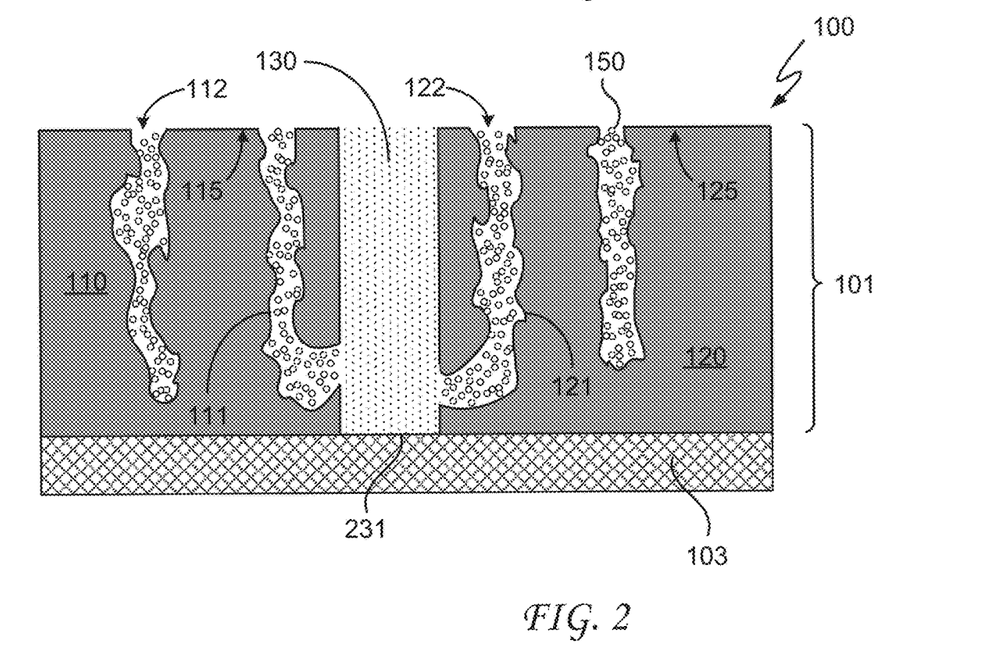

Referring now to the drawings, FIGS. 1 and 2 are cross-sectional views of an energy storage structure 100 that will be used to guide an initial discussion introducing concepts and structures that will aid in the understanding of embodiments of the present invention. As illustrated in FIG. 1, energy storage structure 100 comprises an energy storage device 101 and a conductive support structure 102. Alternatively, as illustrated in FIG. 2, energy storage structure 100 comprises energy storage device 101 and a non-conductive support structure 103. Energy storage device 101 comprises an electrically conductive structure 110 and an electrically conductive structure 120 separated from each other by a separator 130 that is an electron insulator and an ionic conductor. Separator 130 prevents electrically conductive structures 110 and 120 from physically contacting each other, thereby preventing an electrical short circuit. (In other embodiments, for reasons discussed below, a separator is not necessary and can be omitted.)

At least one of electrically conductive structures 110 and 120 comprises a porous structure containing multiple channels, each one of which has an opening to a surface of the porous structure. This feature is a result of the process, described below, used to form the porous structure. As an example, the porous structure may be formed within a conductive or a semiconductive material. Alternatively, the porous structure may be formed within an insulating material (e.g., alumina) that has been coated with an electrically conductive film (e.g., an ALD conductive film such as titanium nitride (TiN)). In this regard, materials having greater electrical conductivity are advantageous because they lower the energy storage device's effective series resistance (ESR). In the illustrated embodiments, both electrically conductive structure 110 and electrically conductive structure 120 comprise such a porous structure. Accordingly, electrically conductive structure 110 comprises channels 111 with openings 112 to a surface 115 of the corresponding porous structure and electrically conductive structure 120 comprises channels 121 with openings 122 to a surface 125 of the corresponding porous structure.

Various configurations of energy storage device 101 are possible. In the embodiment of FIG. 1, for example, energy storage device 101 comprises two distinct porous structures (that is, electrically conductive structure 110 and electrically conductive structure 120) that have been bonded together face-to-face with separator 130 in between. As another example, in the embodiment of FIG. 2 energy storage device 101 comprises a single planar porous structure in which a first section (electrically conductive structure 110) is separated from a second section (electrically conductive structure 120) by a trench 231 containing separator 130. One of the electrically conductive structures will be the positive side and the other electrically conductive structure will be the negative side. Trench 231 may separate electrically conductive structure 110 and 120 along a straight line, but alternatively may separate them using a more complex shape such as the meandering space between the fingers of two interdigitated electrodes.

As an example, separator 130 could be a permeable membrane or other porous polymer separator. In general, the separator prevents the physical contact of anode and cathode (which could cause an electrical malfunction in the device) while permitting the transfer of ionic charge carriers. In addition to polymer separators, several other separator types are possible. These include non-woven fiber sheets or other non-woven separators, liquid membranes, polymer electrolytes, solid ion conductors, glass fiber, paper, ceramic, and the like. In some embodiments, non-woven separators are concentrations of fibers that are either randomly oriented or are arranged in a directional pattern.

It should be noted that the separator, although shown in FIG. 2, may not be necessary in the configuration illustrated there because, for example, support structure 102 could be used to maintain a physical separation between structures 110 and 120. As another example, electrically conductive structures 110 and 120 could each be attached to a ceramic package (not shown) that would keep the two electrically conductive structures physically separate from each other.

As an example, the porous structure of electrically conductive structures 110 and 120 can be created by a wet etch process in which a liquid etchant applied to a surface of the electrically conductive structures etches away portions of the electrically conductive structure in a way that is at least somewhat similar to the way water is able to carve channels in rock. This is why each one of the channels has an opening to the surface of the electrically conductive structure; the wet etch method is incapable of creating fully-enclosed cavities, i.e., cavities with no opening to the surface, like an air bubble trapped inside a rock, within the porous structure. This is not to say that those openings cannot be covered with other materials or otherwise closed up because of the presence of or addition of other materials—that is in fact likely to occur in several embodiments—but, whether covered or not, the described openings to the surface are a feature of each channel in each porous structure according to at least one embodiment of the invention. (One embodiment in which the openings may be covered up is one in which a layer of epitaxial silicon as a location for circuitry or other wiring is grown on top of the channels).

With the right etchant, it should be possible to make porous structures having the described characteristics from a wide variety of materials. Silicon in various forms—including metallurgical grade silicon, monocrystalline silicon, polycrystalline silicon, and silicon on insulator—is one material that works well. As an example, a porous silicon structure may be created by etching a silicon substrate with a mixture of hydrofluoric acid (HF) and ethanol or isopropyl alcohol. More generally, porous silicon and other porous structures may be formed by such processes as anodization and stain etching. Etching techniques according to embodiments of the invention will be discussed in more detail below.

Besides porous silicon, which has already been mentioned, some other materials that may be especially well-suited for energy storage devices according to embodiments of the invention are porous germanium and porous tin. Possible advantages of using porous silicon include its compatibility with existing silicon technology and its abundance in the earth's crust. Porous germanium enjoys a similar advantage as a result of existing technology for that material and, as compared to silicon, enjoys the further possible advantage that its native oxide (germanium oxide) is water-soluble and so is easily removed. (The native oxide that forms on the surface of silicon may trap charge, which is an undesirable result.) Porous germanium is also highly compatible with silicon technology. Possible advantages of using porous tin, which is a zero-band-gap material, include its enhanced conductivity with respect to certain other conductive and semiconductive materials.

Other materials may also be used for the porous structure, including semiconducting materials such as gallium arsenide (GaAs), indium phosphide (InP), boron nitride (BN), silicon carbide (SiC), and alloys such as an alloy of silicon and germanium. Organic semiconductors may also be used. In some embodiments the semiconducting materials—or even insulating materials—may be treated to make them electrically conductive (or more highly conductive). An example is silicon that is degenerately doped with boron. In addition to porous semiconducting substrates, porous conducting substrates may also be used for ECs, including substrates composed of metals such as copper, aluminum, nickel, calcium, tungsten, molybdenum, and manganese.

Referring again to FIGS. 1 and 2, energy storage structure 100 further comprises (in the embodiment illustrated in FIG. 1) an electrically conductive coating 140 on at least a portion of the porous structure and in at least some of channels 111 and/or channels 121. Such an electrically conductive coating may be necessary in order to maintain or enhance the conductivity of the porous structure, which can also lower the ESR, thereby improving performance. For example, a device having lower ESR is able to deliver higher power (which may be manifested in terms of greater acceleration, more horse power, etc.). In contrast, higher ESR (a condition that often prevails inside a typical battery) limits the amount of available energy, at least partially due to the fact that much of the energy is wasted as heat, which is a key consideration for both long-term performance and safety.

Illustrated in FIGS. 1 and 2 is an electrolyte 150, which gives rise to the EDL, as explained above. Electrolyte 150 (as well as the other electrolytes described herein) is represented in the drawings using a random arrangement of circles. This representation is intended to convey the idea that the electrolyte is a substance (liquid or solid, including gel-like materials) containing free ionic charge carriers. The circles were chosen for convenience and are not intended to imply any limitation as to the electrolyte components or qualities, including any limitation with respect to the size, shape, or number of the ionic charge carriers.

Figure 3:
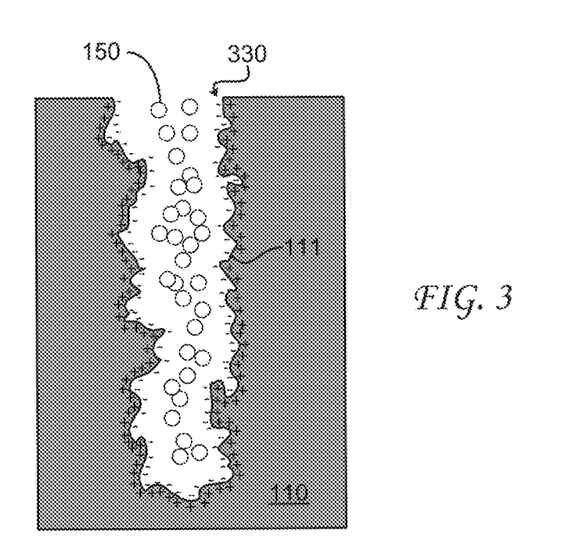
FIG. 3 is a depiction of an electric double layer formed within a channel of a porous structure according to an embodiment of the invention.

After the introduction of electrolyte 150, an electric double layer is formed within the channels of the porous structure, as depicted schematically in FIG. 3. In that figure, an electric double layer 330 has been formed within one of channels 111. EDL 330 is made up of two components: the electrical charge of the sidewalls of channel 111 (depicted as being positive in FIG. 3 but which in other embodiments could be negative); and the free ionic charge carriers in the electrolyte. EDL 330 thus provides a separation of charge that is necessary in order for the capacitor to function. As explained earlier, the large capacitance, and, hence, energy storage potential, of EDL capacitors arises in part due to the small (approximately 1 nanometer (nm)) separation distance between electrolyte ionic charge carriers and the electrode surface charge.

It should be noted that the FIG. 1 and FIG. 2 depictions of the porous structures are highly idealized in that, to mention just one example, all of channels 111 and 121 are shown as only extending vertically. In reality the channels may branch off in multiple directions to create a tangled, disordered pattern that may look something like the porous structure shown in FIG. 4.

Figure 4A:
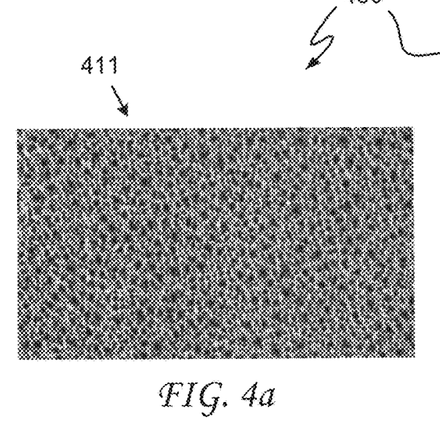
FIGS. 4a and 4b are images of, respectively, a surface and a cross-sectional slice of a porous silicon structure.
Figure 4B:
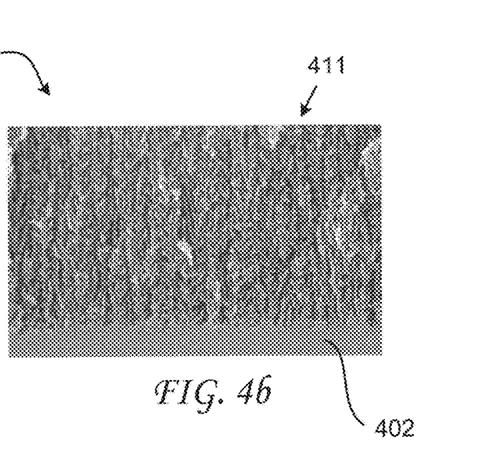

FIGS. 4a and 4b are scanning electron microscope (SEM) images of, respectively, a surface and a cross-sectional slice of a porous structure 400 (in this case porous silicon). As illustrated, porous structure 400 contains multiple channels 411. It should be understood that channels 411 are likely to twist and turn along their lengths such that a single channel may have both vertical and horizontal portions as well as portions that are neither completely vertical nor completely horizontal but fall somewhere in between. Note that in FIG. 4b, the channels extend near to but do not quite reach a bottom of the etched structure, thus leaving a layer 402 of un-etched silicon underneath the channels. In one embodiment, un-etched layer 402 acts as a support structure for porous structure 400 (and for the corresponding energy storage device, not shown), and is thus the equivalent of support structure 102.

Figure 5:
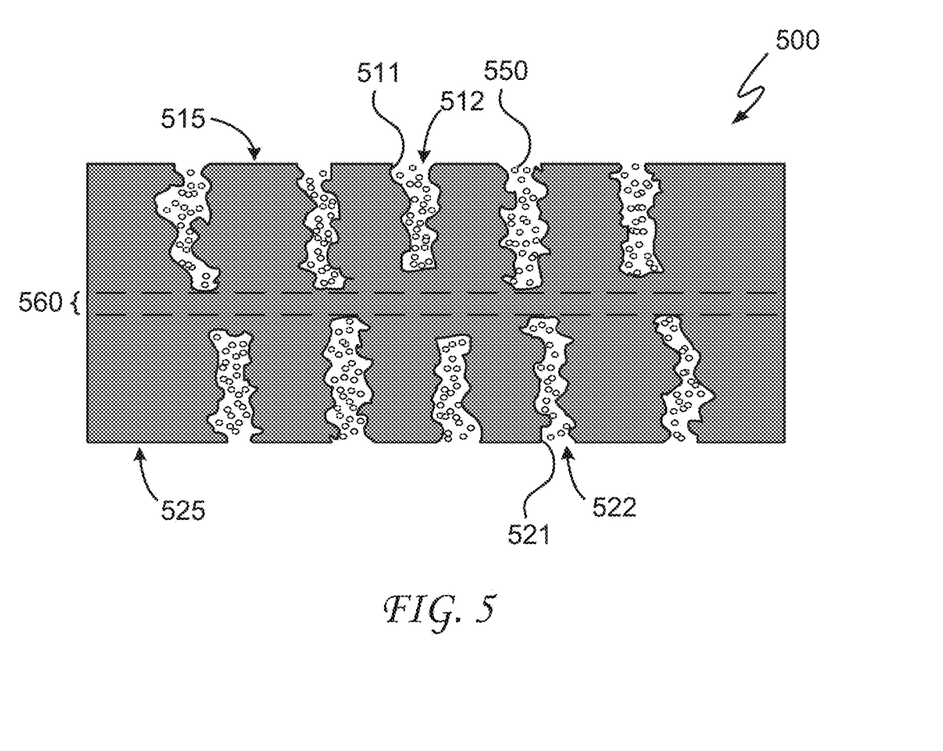
FIG. 5 is a cross-sectional view of a double-sided porous structure that may be used in an energy storage device according to an embodiment of the invention.

FIG. 5 is a cross-sectional view of a double-sided porous structure 500 according to an embodiment of the invention. As will be further discussed below, double-sided porous structure 500 may be used as a component of an energy storage device according to embodiments of the invention. As illustrated in FIG. 5, double-sided porous structure 500 comprises a surface 515 and an opposing surface 525. Each one of a plurality of channels 511 has an opening 512 to surface 515 of structure 500, and each one of a plurality of channels 521 has an opening 522 to surface 525 of structure 500. Both sets of channels contain an electrolyte 550. An electrically conductive center portion 560 lies between channels 511 and 521.

Double-sided porous structure 500 may be formed by etching a substrate from both sides (one side at a time), stopping prior to reaching the substrate's midpoint so as to leave the center section (560). The accuracy of the etch process is such that it may be controlled at least to within a micron or so, and center section 560 may thus have a thickness of roughly one micron, if desired. In certain embodiments, however, thicker values are used for center section 560 because the greater thickness provides a greater measure of mechanical strength to the overall structure. Thus, in some embodiments, center section 560 may have a thickness of roughly five or 10 microns or more.

The etching may be accomplished using an electrochemical etch that makes use of a dilute mixture of HF and isopropyl alcohol (or ethanol or the like) to form nanometer pores that can extend through a significant portion of the substrate. As an example, a double-sided porous structure such as double-sided porous structure 500 may be prepared by applying an electrochemical etch technique to a solid silicon wafer having an initial resistivity of 0.7 milli-ohm centimeters (mΩ-cm) using as the etchant one of the HF mixtures referred to above. A current density in a range of approximately 25 milliamps per square centimeter (mA/cm$^2$) to 500 mA/cm$^2$ may be used. (The area component in these values refers to an area of the substrate surface before formation of the pores.)

In addition to providing mechanical strength, center section 560 forms an electrical connection between the tips of channels 511 and the tips of channels 522. Significantly, the width of the entire silicon substrate may be used for this electrical connection, which significantly lowers resistivity compared to a structure having a smaller connection profile. Furthermore, the relatively small thickness of the center section (e.g., 5-10 microns, as discussed above) offers a low-resistance path across which charge can flow.

The foregoing discussion has made reference to porous structures—including double-sided porous structures—according to embodiments of the invention. These porous structures, as mentioned above, can be formed within a variety of materials, including silicon (in various forms, including metallurgical grade silicon, monocrystalline silicon, polycrystalline silicon, and silicon on insulator), germanium, GaAs, InP, BN, CdTe, tin, copper, aluminum, nickel, calcium, tungsten, molybdenum, manganese, silicon carbide, organic semiconductors, and silicon-germanium alloys. The material from which the porous structure is made can, in at least some embodiments, be doped with elements that increase its conductivity; this may be done using standard techniques that are known in the art. In one embodiment, the material in which the porous structure is formed is silicon and the dopant species is boron, which may be introduced into the silicon in a concentration of, for example, $10^{19}$ atoms/cm$^3$. Other possible dopants include phosphorus and arsenic (though these and other n-type dopants require an illumination process during etching that p-type dopants do not).

Embodiments of the invention that rely on electrochemical etching as the channel creation technique have another reason for introducing dopants into the material from which the porous structure is to be made. Where silicon and an HF etchant are involved, it is thought that a high electric field attracts holes at defects and at the tip of the pores that aid the reaction between the silicon and the fluorine from the etchant. It is thought that the process involves the formation of $SiF_4$ molecules in liquid form. The $SiF_4$ gets pulled away and eventually gets washed out of the channels, leaving hydrogen atoms that bond to the sidewalls and also form $H_2$ that then bubbles away as a gas. Some hydrogen atoms remain, these bond with remaining silicon atoms. This process etches the channel (anisotropically) downward as opposed to expanding laterally in an isotropic manner (which would simply polish the surface without forming channels). Additional details, as best understood, are set forth below (though it must be said that precise details of the mechanism of porous silicon formation remain at least somewhat unclear).

In general terms, during channel formation, direct dissolution of the semiconductor almost always competes with oxidation plus subsequent dissolution of the oxide. The etchant (e.g., HF), therefore, has to be able to dissolve the oxide. A second prerequisite for the dissolution reaction and thereby channel formation in a semiconductor is the availability of electronic holes. The silicon surface, in contact with aqueous HF solutions, becomes saturated by hydrogen, depleted of electronic holes, and tends to be chemically inactive with respect to the electrolyte (this protects the channel sidewalls during the etching process). If a voltage is applied to the electrodes, the holes present in a silicon wafer start migrating towards the silicon-electrolyte interface. At the interface, a hole removes one silicon bond and thereby makes one silicon atom more susceptible for interactions with the electrolyte. Eventually, the silicon atom is transferred into the solution. The electrode decomposes into areas with optimal current density and channels are formed in areas with almost no current density. According to different models, initiation of the channel growth could begin at micro-cavities, structural defects, mechanically strained areas, or local perturbation of the surface potential field.

Double-sided porous silicon substrates (or double-sided porous structures formed in other suitable materials)—such as double-sided porous structure 500—can be arranged so as to form a stack of electrochemical capacitors that can be connected to each other in such a way that they form an energy storage device capable of achieving better performance than any of the ECs can achieve individually. Large increases in energy storage capacity and in voltage may be achieved by stacking multiple porous substrates in this way, as further explained below.

As for any capacitor, the energy E of an ideal electrochemical capacitor depends on its capacitance and voltage as shown in Equation 1, $$E = \frac{1}{2}CV^2. \quad \text{[Eq. 1]}$$

Accordingly, increasing the capacitance C and/or (especially) the voltage V of an electrochemical capacitor will result in an increase in stored energy E. An objective for any energy storage device is, of course, to increase the amount of energy that can be stored, but increasing achievable voltage is often important as well because of the operating voltage requirements of circuits with which the energy storage device may be used. Embodiments of the invention address both of these issues by enabling the stacked configuration mentioned above. Electrically connecting two capacitors (of equal capacitance and equal energy) to each other in series—as is done when two (or more) electrically conductive porous structures are brought into contact with each other and stacked—results in a doubling (compared to either capacitor alone) of the energy and of the voltage and a reduction in the capacitance by a factor of two. More generally with respect to capacitance, n capacitors connected in series yield a total capacitance $1/C=1/C_1+1/C_2+ \ldots +1/C_n$. It is important to note that although no additional energy is created by stacking two capacitors in series—the energy of two identical capacitors in series is just the sum of the energy of the two individual capacitors—the specific energy capacity (energy per weight) and energy density (energy per volume) of the system may be significantly improved due to the utilization of both sides of the two-sided porous substrates.

The stacking of multiple double-sided porous substrates may lead to cost reductions as well, by reducing packaging steps and material and, significantly, by allowing for more cost efficient use of material. To improve cost efficiency it is desirable to minimize the cost of producing the substrate while maximizing the total energy stored per unit volume of substrate material. In this regard, it should be understood that the depth D of the channels may be limited by considerations such as the ability of ionic charge carriers to move freely within the channels as well as constraints on the feasibility of performing ALD on high-aspect-ratio structures. Channels that are less deep correspond to less surface area, and because capacitance is directly proportional to surface area, shorter channels lead to less capacitance and therefore to reduced capacity for energy storage. With channel depth thus constrained, techniques for increasing surface area and, likewise, energy storage, are, in at least some embodiments, limited to increasing the number of the depth-constrained channels within a given volume. This is achieved by using starting substrates that are only slightly thicker (D+δ) than the channel depth for single-sided porous substrates while using starting substrates that are nearly twice as thick (2*(D+δ)) for double-sided porous substrates (where δ is the minimum thickness—typically anywhere from one μm to five μm or more—of the non-porous portion of the substrate (which is required to provide mechanical stability)). Using double-sided porous substrates to achieve such an increase can in many circumstances be preferable because double-sided porous substrates either are less expensive than or may be packed more densely than can single-sided porous substrates having an equivalent number of channels. The lower cost is due to the fact that thin wafers are typically more expensive than thick wafers, which is due at least in part to the additional processing necessary to thin a wafer and/or to the material that is removed (and wasted) when a wafer is cut and thinned. The greater channel density arises out of the fact that the ratio of solid material (without channels) to porous material is lower for double-sided porous substrates, and leads to the greater specific energy capacity and greater energy density that were mentioned above.

Additional cost savings are possible as a result of the fact that using double-sided substrates enables the elimination of nearly half of the assembly steps that would be required for single-sided substrates. This is because each double-sided substrate in a stack will contain roughly twice as many channels as will a single-sided substrate; a given number of channels will therefore be achievable using roughly half as many double-sided as single-sided substrates, and the lower number of double-sided substrates may be assembled using roughly half the number of stacking and other assembly operations.

Because increases in energy storage capacity and in voltage are both desirable results, stacked EC configurations of the type enabled by embodiments of the invention offer significant advantages. If desired, the individual components (that is, the individual porous substrates) of the stacked energy storage device can be electrically connected in parallel—e.g., by using conductors that make contact with the sides of the substrates—which yields a doubling in capacitance and energy at a constant voltage level.

Figure 6:
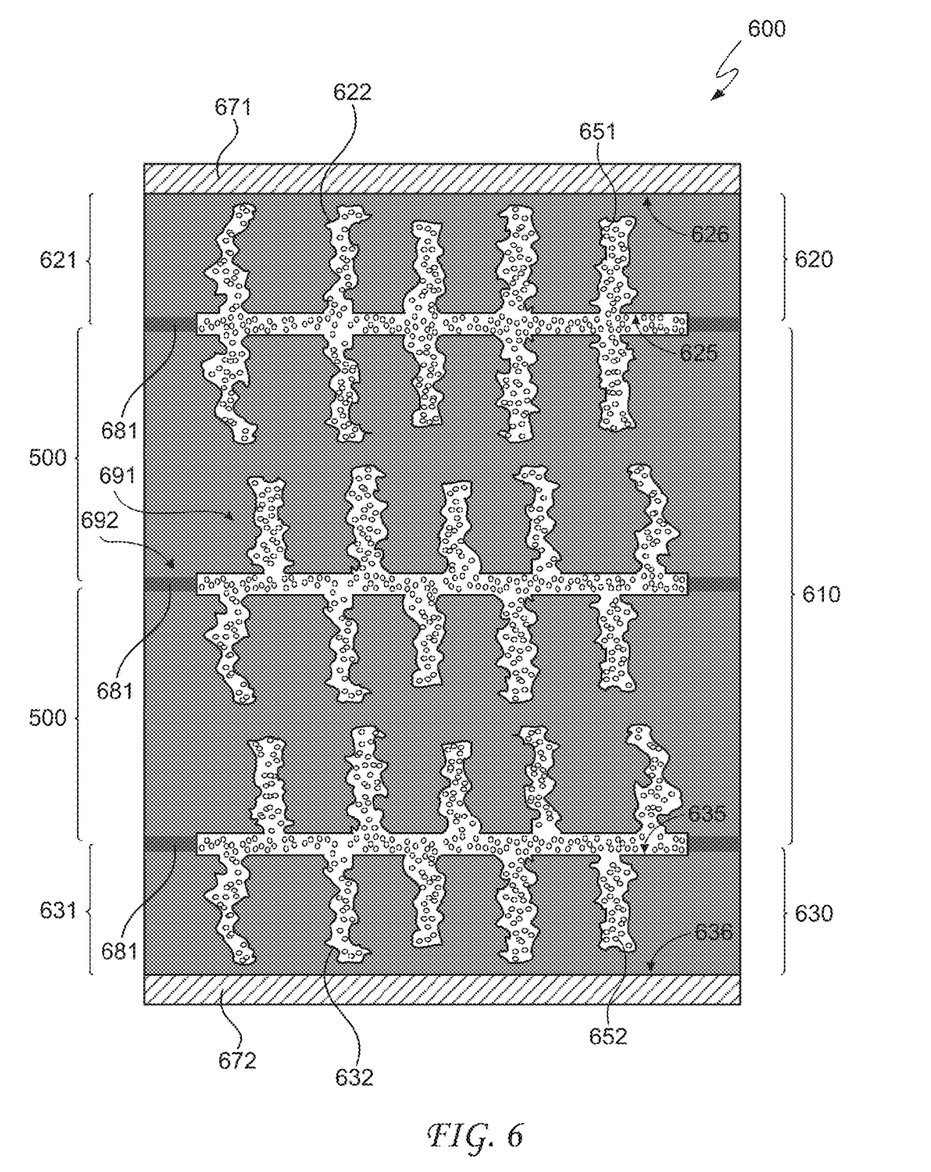
FIGS. 6 and 7 are cross-sectional views of energy storage devices according to embodiments of the invention.

FIG. 6 is a cross-sectional view of an energy storage device 600 according to an embodiment of the invention. As illustrated in FIG. 6, energy storage device 600 comprises a middle section 610 comprising two double-sided porous structures that both are the same as or similar to double-sided porous structure 500 that is first shown in FIG. 5. In non-illustrated embodiments, middle section 610 can include more than two double-sided porous structures. In addition to middle section 610, energy storage device 600 also comprises an upper section 620 containing a single-sided porous structure 621 and a lower section 630 containing a single-sided porous structure 631.

Single-sided porous structure 621 is similar to double-sided porous structure 500 except that it contains only a single set of channels 622 opening to a surface 625. Channels 622 contain an electrolyte 651. A surface 626 of structure 621—opposite surface 625—is adjacent to an electrically conductive layer 671. Similarly, single-sided porous structure 631 contains a single set of channels 632 opening to a surface 635 and containing an electrolyte 652. A surface 636 of structure 631—opposite surface 635—is adjacent to an electrically conductive layer 672. Conductive layer 671 has a first polarity, while conductive layer 672 has a second polarity that is opposite the first polarity. In other words, if conductive layer 671 is held at a positive potential then conductive layer 672 has a negative potential, and vice versa. In certain embodiments, conductive layers 671 and 672 are collectors of energy storage device 600. In some embodiments these collectors may be omitted from energy storage device 600, in which case the areas of structures 621 and 631 that are located between the channels and, respectively, surfaces 626 and 636 act as the collectors.

Energy storage device 600 further comprises a separator 681 located between each pair of adjacent porous structures. Like separator 130, described above and first shown in FIG. 1, separator 681 is an electron insulator and an ionic conductor, and ensures that the adjacent porous structures do not electrically short circuit to each other. As an example, the separator can be a polymer separator, a non-woven separator, a liquid membrane, a polymer electrolyte, a solid ion conductor, a glass fiber, a paper material, a ceramic material, or the like. In some embodiments, separator 681 may be replaced with an epoxy or another suitable adhesive located in the same place.

Referring still to FIG. 6, in some embodiments one or more of the porous structures can have an interior region 691 that contains the channels and an exterior region 692 adjacent to the interior region and that comprises an un-etched portion of the porous structure. Exterior region 692 may be thicker than interior region 691, meaning that it extends to a greater distance from center section 560. The extra height of the exterior region would provide a space in which to insert a separator, if desired. Interior region 691 could be created by etching into a wafer so as to remove a layer of material in the interior region, thus defining an area in which to later etch the channels, while leaving the material of the exterior in place.

Figure 7:
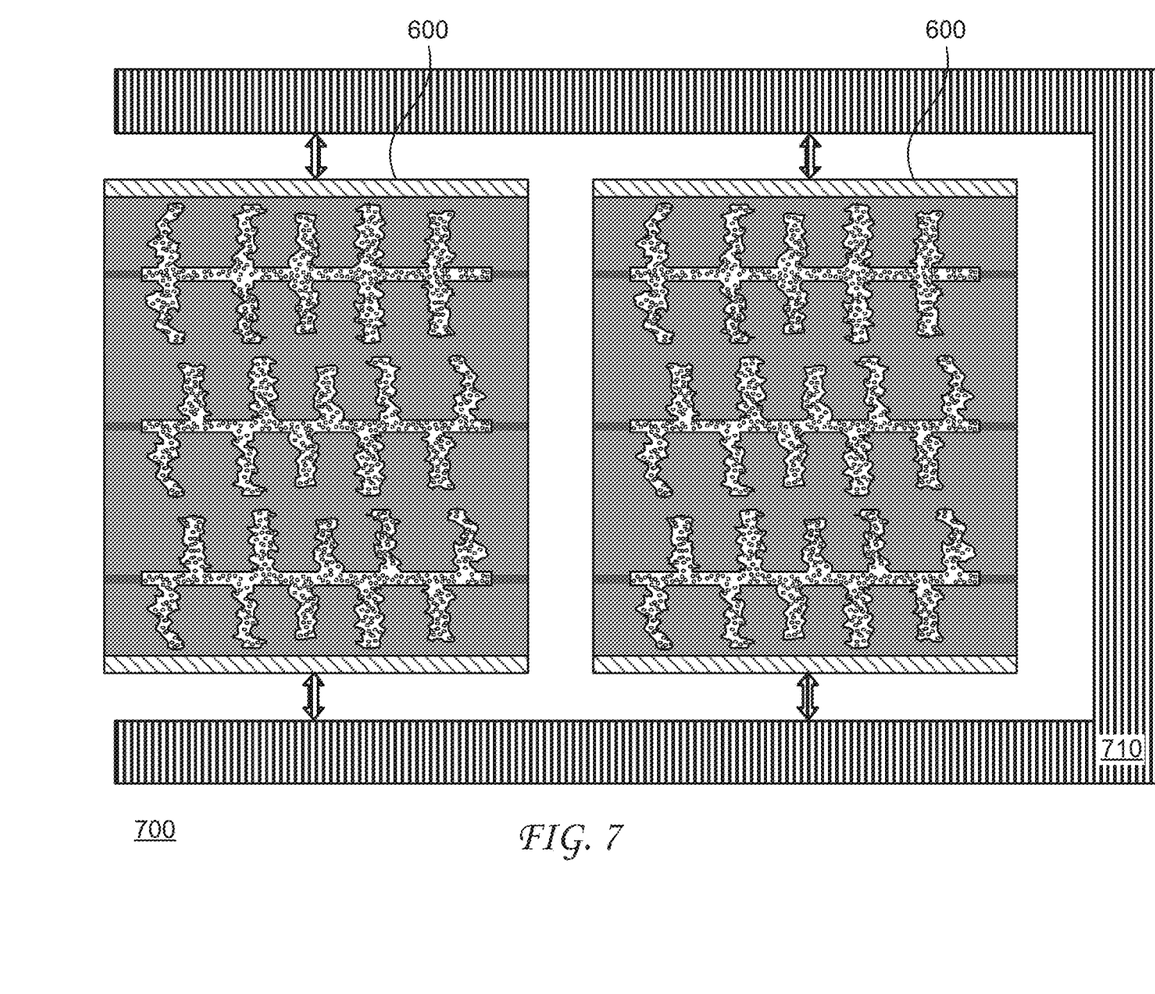

FIG. 7 is a cross-sectional view of an energy storage device 700 according to an embodiment of the invention. As illustrated in FIG. 7, energy storage device 700 comprises a plurality of energy storage units electrically connected to each other in parallel. Each energy storage unit is the same as or similar to energy storage device 600. Energy storage device 700 further comprises a switching network 710 associated with energy storage units 600. When an EC capacitor is being discharged it doesn't maintain a constant voltage but instead uniformly decreases during discharge (unlike a battery where the voltage stays relatively constant during discharge). Switching network 710 comprises circuitry or some other mechanism that switches various capacitors in and out such that a relatively constant voltage is maintained. For example, the energy storage devices could initially be connected to each other in parallel and then, after a certain amount of voltage decay, a subset of the energy storage devices could be changed by the switching network so as to be connected in series such that their individual voltage contributions can boost the declining overall voltage. In one embodiment switching network 710 could be implemented using existing silicon device technology as used in the art (transistors, silicon controlled rectifiers (SCRs), etc.), while in other embodiments it could be implemented using micro-electromechanical systems (MEMS) relays or switches (which, it may be noted, tend to have very low resistance).

Figure 8:
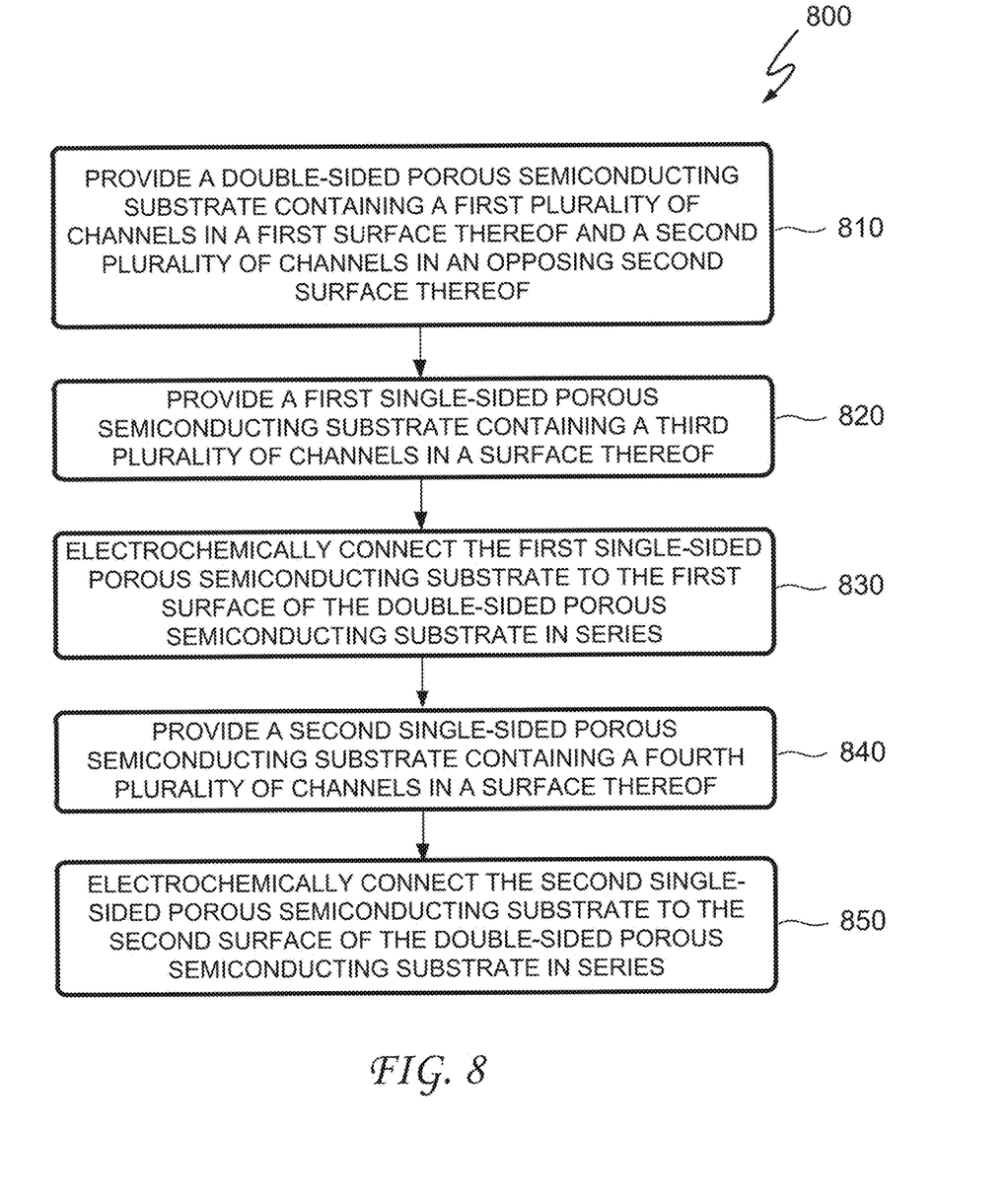
FIG. 8 is a flowchart illustrating a method of manufacturing an energy storage device according to an embodiment of the invention.

FIG. 8 is a flowchart illustrating a method 800 of manufacturing an energy storage device according to an embodiment of the invention. As an example, method 800 can result in the creation of an energy storage device such as energy storage device 600 that is shown in FIG. 6.

An operation 810 of method 800 is to provide a double-sided porous structure containing a first plurality of channels in a first surface thereof and a second plurality of channels in an opposing second surface thereof. As an example, the double-sided porous structure can be similar to double-sided porous structure 500 that is first shown in FIG. 5. The first plurality of channels, as well as the additional pluralities of channels formed in subsequent operations of method 800, can be filled with an electrolyte.

In one embodiment, operation 810 comprises performing a first etch on the first surface of the substrate so as to form the first plurality of channels therein, performing a second etch on the second surface of the substrate so as to form the second plurality of channels therein, and controlling a depth of the first etch and a depth of the second etch so as to leave an un-etched center portion between the first plurality of channels and the second plurality of channels. As an example, the center portion can be similar to center portion 560 that is first shown in FIG. 5.

An operation 820 of method 800 is to provide a first single-sided porous structure containing a third plurality of channels in a surface thereof. As an example, the first single-sided porous structure can be similar to single-sided porous structure 621 that is first shown in FIG. 6.

An operation 830 of method 800 is to electrochemically connect the first single-sided porous structure to the first surface of the double-sided porous structure in series. The phrase "electrochemically connect" is used in this context (and elsewhere herein where applicable) because of the dual nature of the charge transfer mechanism—involving both electrons and ionic charge carriers—within EC capacitors.

An operation 840 of method 800 is to provide a second single-sided porous structure containing a fourth plurality of channels in a surface thereof. As an example, the second single-sided porous structure can be similar to single-sided porous structure 631 that is first shown in FIG. 6.

An operation 850 of method 800 is to electrochemically connect the second single-sided porous structure to the second surface of the double-sided porous structure in series.

In some embodiments, method 800 further comprises providing a separator between one or more pairs of adjacent porous structures. As an example, the separator can be similar to separator 681 that is first shown in FIG. 6.

Although the invention has been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that the energy storage device and the related structures and methods discussed herein may be implemented in a variety of embodiments, and that the foregoing discussion of certain of these embodiments does not necessarily represent a complete description of all possible embodiments.

Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. An energy storage device comprising:
a double-sided porous structure having a first surface and an opposing second surface, the double-sided porous structure containing:
a first set of channels, each of which have an opening to the first surface of the double-sided porous structure;
a second set of channels, each of which have an opening to the second surface of the double-sided porous structure;
an electrically conductive center portion between the first and second sets of channels; and
an electrolyte contained within the first set of channels and the second set of channels;
a first single-sided porous structure adjacent to the first surface of the double-sided porous structure, the first single-sided porous structure having a first surface and an opposing second surface and containing a third set of channels, each of which have an opening to the first surface of the first single-sided porous structure and each of which contain an electrolyte; and
a second single-sided porous structure adjacent to the second surface of the double-sided porous structure, the second single-sided porous structure having a first surface and an opposing second surface and containing a fourth set of channels, each of which have an opening to the first surface of the second single-sided porous structure and each of which contain an electrolyte;
wherein the double-sided porous structure, first single-sided porous structure, and second single-sided porous structure are formed in solid material.

2. The energy storage device of claim 1 further comprising:
a first electrically conductive layer at the second surface of the first single-sided porous structure, the first electrically conductive layer having a first polarity; and
a second electrically conductive layer at the second surface of the second single-sided porous structure, the second electrically conductive layer having a second polarity that is opposite the first polarity.

3. The energy storage device of claim 1 further comprising:
a separator between one of the single-sided porous structures and the double-sided porous structure, where the separator prevents electrical contact between the double-sided porous structure and the single-sided porous structure but permits ionic charge carriers from the electrolyte to pass through.

4. The energy storage device of claim 1 further comprising:
a first separator between the double-sided porous structure and the first single-sided porous structure, the first separator preventing electrical contact between the double-sided porous structure and the first single-sided porous structure but permitting ionic charge carriers from the electrolyte to pass through; and
a second separator between the double-sided porous structure and the second single-sided porous structures, the second separator preventing electrical contact between the double-sided porous structure and the second single-sided porous structure but permitting ionic charge carriers from the electrolyte to pass through.

5. The energy storage device of claim 1 further comprising:
a second double-sided porous structure adjacent to the double-sided porous structure, wherein the second double-sided porous structure has a first surface and an opposing second surface and contains:
a fifth set of channels, each of which have an opening to the first surface of the second double-sided porous structure;
a sixth set of channels, each of which have an opening to the second surface of the double-sided porous structure;
an electrically conductive center portion between the fifth and sixth sets of channels; and
an electrolyte contained within the fifth set of channels and the sixth set of channels.

6. The energy storage device of claim 5 wherein:
the first and second double-sided porous structures are electrochemically connected in series.

7. The energy storage device of claim 5 wherein:
the first double-sided porous structure is electrochemically connected to the first single-sided porous structure; and
the second double-sided porous structure is electrochemically connected to the second single-sided porous structure, such that a resulting equivalent electrical circuit contains a plurality of capacitors electrically connected in parallel.

8. The energy storage device of claim 1 wherein:
at least one of the porous structures comprises an interior region containing the channels and an exterior region adjacent to the interior region; and
the exterior region is thicker than the interior region.

9. The energy storage device of claim 8 wherein:
the exterior region comprises an un-etched portion of the porous structure.

10. The energy storage device of claim 1 wherein:
the double-sided porous structure is formed from a semiconducting material or from a conducting material.

11. The energy storage device of claim 1, wherein each of the channels in the double-sided porous structure has an opening to a surface of the double-sided porous structure;
wherein each of the channels in the first single-sided porous structure has an opening to a surface of the first single-sided porous structure; and
wherein each of the channels in the second single-sided porous structure has an opening to a surface of the second single-sided porous structure.

12. The energy storage device of claim 1, wherein the solid material is silicon, germanium, GaAs, InP, BN, CdTe, tin, copper, aluminum, nickel, calcium, tungsten, molybdenum, manganese, silicon carbide, an organic semiconductor, or a silicon-germanium alloy.

13. The energy storage device of claim 1, wherein the first set of channels, second set of channels, third set of channels, and fourth set of channels are formed by etching the solid material.

* * * * *